(12) United States Patent
Whelan

(10) Patent No.: US 8,914,604 B2
(45) Date of Patent: Dec. 16, 2014

(54) CREATING OPTIMAL COMPARISON CRITERION WITHIN ASSOCIATIVE MEMORIES

(75) Inventor: John Whelan, Burien, WA (US)

(73) Assignee: The Boeing Company, Chicago, IL (US)

( * ) Notice: Subject to any disclaimer, the term of this patent is extended or adjusted under 35 U.S.C. 154(b) by 241 days.

(21) Appl. No.: 13/494,634

(22) Filed: Jun. 12, 2012

(65) Prior Publication Data

US 2013/0332671 A1 Dec. 12, 2013

(51) Int. Cl.
  *G06F 12/00* (2006.01)
(52) U.S. Cl.
  USPC .......................................... 711/170; 711/108
(58) Field of Classification Search
  USPC .................... 711/170, 108, E12.001
  See application file for complete search history.

(56) References Cited

U.S. PATENT DOCUMENTS

| | | | |
|---|---|---|---|
| 4,144,564 | A | 3/1979 | Lamb |
| 4,149,262 | A | 4/1979 | Lamb et al. |
| 5,014,327 | A | 5/1991 | Potter et al. |
| 5,253,327 | A | 10/1993 | Yoshihara |
| 7,647,335 | B1 * | 1/2010 | Colecchia ............... 707/999.102 |
| 2009/0083207 | A1 | 3/2009 | Aparicio, IV |
| 2013/0080448 | A1 * | 3/2013 | Arnold et al. ................. 707/749 |

FOREIGN PATENT DOCUMENTS

DE    3720195 A1    1/1989

OTHER PUBLICATIONS

Prokopenko et al., "Optimizing Associative Information Transfer Within Content-addressable Memory," International Journal of Unconventional Computation, vol. 3, Issue 3, Special issue: "Towards Theory of Unconventional Computing," 2008, pp. 273-296.
European Search Report, dated Jul. 30, 2013, regarding Application No. EP13168898.8, 6 pages.
Mu et al., "A Weighted Voting Model of Associative Memory," IEEE Transactions on Neural Networks, vol. 8, No. 3, May 2007, pp. 756-777.

* cited by examiner

*Primary Examiner* — Mardochee Chery
(74) *Attorney, Agent, or Firm* — Yee & Associates, P.C.

(57) ABSTRACT

A system including an associative memory including a plurality of data and a plurality of associations among the plurality of data. The plurality of data is collected into associated groups. The associative memory is configured to be queried based on at least indirect relationships among the plurality of data. The system also includes an input device in communication with the associative memory, the input device configured to receive an input criteria. The system also includes an optimizer in communication with the input device and the associative memory. The optimizer is configured to generate, using the associative memory, a multi-dimensional criteria file from the input criteria. The optimizer converts the input criteria to numerical representations associated with expert weights and generates the multi-dimensional criteria file to include an optimized plurality of criteria relevant to the input criteria.

22 Claims, 14 Drawing Sheets

FIG. 3

| KEYWORDS | LOW | | MED | | HIGH |
|---|---|---|---|---|---|
| 302 ⋮ | | | | | |
| material_boiling_point | ☐ | ☐ | ☐ | ☐ | ☐ |
| material_ingredient_max | ☐ | ☐ | ☐ | ☐ | ☐ |
| material_ingredient_min | ☐ | ☐ | ☐ | ☐ | ☐ |
| material_ingredient name | ☐ | | | | ☐ |
| material_ingredient_norm | ☐ | | ? | | ☐ |
| material_ph | ☐ | | | | ☐ |
| material_physical_state | ☐ | | | | ☐ |
| material_reactive_nfpa | ☐ | ☐ | ☐ | ☐ | ☐ |
| material_specific_grav_ingredient | ☐ | ☐ | ☐ | ☐ | ☐ |
| material_vapor_pressure | ☐ | ☐ | ☐ | ☐ | ☐ |
| 304 ⋮ | | | | | |

| Criteria Significance Attributes | Low | | Medium | | High |
|---|---|---|---|---|---|
| Size | ☐ | ☐ | ☐ | ☐ | ☐ 506 |
| Weight | ☐ | ☐ | ☐ | ☐ | ☐ |
| Location | ☐ | ☐ | ☐ | ☐ | ☐ |
| Type | ☐ | ☐ | ☐ | ☐ | ☐ |
| Manufacturer | ☐ | ☐ | ☐ | ☐ | ☐ |
| Model | ☐ | ☐ | ☐ | ☐ | ☐ |
| Series | ☐ | ☐ | ☐ | ☐ | ☐ |
| Factory | ☐ | ☐ | ☐ | ☐ | ☐ |
| Region | ☐ | ☐ | ☐ | ☐ | ☐ |
| Material | ☐ | ☐ | ☐ | ☐ | ☐ |
| Corrosion Resistant | ☐ | ☐ | ☐ | ☐ | ☐ |
| Rust Resistant | ☐ | ☐ | ☐ | ☐ | ☐ |
| Waterproof | ☐ | ☐ | ☐ | ☐ | ☐ |

602 (Table top-left)

| Criteria Significance Attributes | Low | | Medium | | High |
|---|---|---|---|---|---|
| Size | ☐ | ☐ | ☐ | ☐ | ☐ |
| Weight | ☐ | ☐ | ☐ | ☐ | ☐ |
| Location | ☐ | ☐ | ☐ | ☑ | ☐ |
| Type | ☐ | ☐ | ☐ | ☐ | ☐ |
| Manufacturer | ☐ | ☐ | ☐ | ☑ | ☐ |
| Model | ☐ | ☐ | ☐ | ☐ | ☐ |
| Series | ☐ | ☐ | ☐ | ☐ | ☐ |
| Factory | ☐ | ☐ | ☐ | ☐ | ☐ |
| Region | ☐ | ☐ | ☐ | ☐ | ☐ |
| Material | ☐ | ☐ | ☐ | ☑ | ☐ |
| Corrosion Resistant | ☐ | ☐ | ☐ | ☐ | ☑ |
| Rust Resistant | ☐ | ☐ | ☐ | ☐ | ☑ |
| Waterproof | ☐ | ☐ | ☐ | ☐ | ☑ |

604 (Table top-right)

| Criteria Significance Attributes | Low | | Medium | | High |
|---|---|---|---|---|---|
| Size | ☐ | ☐ | ☐ | ☐ | ☐ |
| Weight | ☐ | ☐ | ☐ | ☐ | ☐ |
| Location | ☐ | ☐ | ☐ | ☐ | ☐ |
| Type | ☑ | ☐ | ☐ | ☐ | ☐ |
| Manufacturer | ☐ | ☐ | ☑ | ☐ | ☐ |
| Model | ☐ | ☐ | ☐ | ☐ | ☐ |
| Series | ☐ | ☐ | ☐ | ☐ | ☐ |
| Factory | ☐ | ☐ | ☐ | ☐ | ☐ |
| Region | ☐ | ☐ | ☐ | ☐ | ☐ |
| Material | ☐ | ☐ | ☐ | ☐ | ☑ |
| Corrosion Resistant | ☐ | ☐ | ☐ | ☐ | ☑ |
| Rust Resistant | ☐ | ☐ | ☐ | ☑ | ☐ |
| Waterproof | ☐ | ☐ | ☑ | ☐ | ☐ |

606 (Table bottom-left)

| Criteria Significance Attributes | Low | | Medium | | High |
|---|---|---|---|---|---|
| Size | ☑ | ☐ | ☐ | ☐ | ☐ |
| Weight | ☑ | ☐ | ☐ | ☐ | ☐ |
| Location | ☐ | ☑ | ☐ | ☐ | ☐ |
| Type | ☐ | ☐ | ☐ | ☐ | ☐ |
| Manufacturer | ☐ | ☐ | ☑ | ☐ | ☐ |
| Model | ☐ | ☐ | ☐ | ☐ | ☐ |
| Series | ☐ | ☐ | ☐ | ☐ | ☐ |
| Factory | ☐ | ☐ | ☐ | ☐ | ☐ |
| Region | ☐ | ☐ | ☐ | ☐ | ☐ |
| Material | ☐ | ☐ | ☑ | ☐ | ☐ |
| Corrosion Resistant | ☐ | ☐ | ☐ | ☐ | ☑ |
| Rust Resistant | ☐ | ☐ | ☑ | ☐ | ☐ |
| Waterproof | ☐ | ☐ | ☑ | ☐ | ☐ |

608 (Table bottom-right)

| Criteria Significance Attributes | Low | | Medium | | High |
|---|---|---|---|---|---|
| Size | ☑ | ☐ | ☐ | ☐ | ☐ |
| Weight | ☑ | ☐ | ☐ | ☐ | ☐ |
| Location | ☐ | ☑ | ☐ | ☐ | ☐ |
| Type | ☑ | ☐ | ☐ | ☐ | ☐ |
| Manufacturer | ☑ | ☐ | ☐ | ☐ | ☐ |
| Model | ☐ | ☐ | ☐ | ☐ | ☐ |
| Series | ☐ | ☐ | ☐ | ☐ | ☐ |
| Factory | ☐ | ☐ | ☐ | ☐ | ☐ |
| Region | ☐ | ☐ | ☐ | ☐ | ☐ |
| Material | ☐ | ☐ | ☑ | ☐ | ☐ |
| Corrosion Resistant | ☐ | ☐ | ☐ | ☐ | ☑ |
| Rust Resistant | ☐ | ☐ | ☐ | ☐ | ☑ |
| Waterproof | ☐ | ☐ | ☐ | ☐ | ☑ |

FIG. 7

| Criteria Significance Attributes | Low | | Medium | | High |
|---|---|---|---|---|---|
| Size | ✓ | ☐ | ☐ | ☐ | ☐ |
| Weight | ✓ | ☐ | ☐ | ☐ | ☐ |
| Location | ☐ | ☐ | ✓ | ☐ | ☐ |
| Type | ✓ | ☐ | ☐ | ☐ | ☐ |
| Manufacturer | ☐ | ☐ | ✓ | ☐ | ☐ |
| Model | ☐ | ☐ | ☐ | ☐ | ☐ |
| Series | ☐ | ☐ | ☐ | ☐ | ☐ |
| Factory | ☐ | ☐ | ☐ | ☐ | ☐ |
| Region | ☐ | ☐ | ☐ | ☐ | ☐ |
| Material | ☐ | ☐ | ☐ | ✓ | ☐ |
| Corrosion Resistant | ☐ | ☐ | ☐ | ☐ | ✓ |
| Rust Resistant | ☐ | ☐ | ☐ | ✓ | ☐ |
| Waterproof | ☐ | ☐ | ☐ | ✓ | ☐ |

702   704

CREATING OPTIMAL COMPARISON CRITERION WITHIN ASSOCIATIVE MEMORIES

BACKGROUND INFORMATION

1. Field

The present disclosure relates generally to associative memory management and in particular to creating optimal comparison criterion within an associative memory for the purpose of improving search criterion when performing data searches in the associative memory.

2. Background

Some users may have difficulty formulating what criteria to use when formulating a query of an associative memory. For example, problems may arise when interpreting data. Additionally, unfamiliarity with the subject matter may lead to the creation of sub-optimal comparisons. Further, use of precise criteria may be helpful when using associative memories to perform entity comparisons when formulating a query. Moreover, a quality associative memory comparison may rely on a user's subject matter expertise in order to perform an entity comparison accurately.

Thus, an issue that may arise when querying associative memories is the question of how to optimally form a query. Another issue that may arise when querying an associative memory is how to optimize a query of the associative memory when the user is not a subject matter expert in the area of interest.

SUMMARY

The illustrative embodiments provide for a system. The system includes an associative memory including a plurality of data and a plurality of associations among the plurality of data. The plurality of data is collected into associated groups. The associative memory is configured to be queried based on at least indirect relationships among the plurality of data. The system also includes an input device in communication with the associative memory, the input device configured to receive an input criteria. The system also includes an optimizer in communication with the input device and the associative memory. The optimizer is configured to generate, using the associative memory, a multi-dimensional criteria file from the input criteria. The optimizer converts the input criteria to numerical representations associated with expert weights and generates the multi-dimensional criteria file to include an optimized plurality of criteria relevant to the input criteria.

The illustrative embodiments also provide for a method. The method is implemented using a computer in conjunction with a non-transitory computer readable storage medium and an associative memory comprising a plurality of data and a plurality of associations among the plurality of data. The plurality of data is collected into associated groups. The associative memory is configured to be queried based on at least indirect relationships among the plurality of data. The method includes receiving an input criteria at an input device in communication with the associative memory. The method also includes generating, using the associative memory and an optimizer in communication with the input device and the associative memory, a multi-dimensional criteria file from the input criteria. The method also includes converting, using the optimizer, the input criteria to numerical representations associated with expert weights. The method also includes generating, using the optimizer, the multi-dimensional criteria file to include an optimized plurality of criteria relevant to the input criteria.

The illustrative embodiments also provide for a system. The system includes an associative memory comprising a plurality of data and a plurality of associations among the plurality of data. The plurality of data is collected into associated groups. The associative memory is configured to be queried based on at least one relationship, selected from a group that includes direct and indirect relationships, among the plurality of data. The associative memory is logically divided into a plurality of perspectives. The plurality of perspectives comprises a corresponding plurality of representations of subsets of the plurality of data. The system also includes an input device configured to receive a first criteria file and a second criteria file. The first criteria file comprises a first attribute category in a first perspective in the plurality of perspectives and a second attribute category in the first perspective. The second criteria file comprises a third attribute category in the first perspective and a fourth attribute category in the first perspective. The first attribute category and the third attribute category are equal. The second attribute category and the fourth attribute category are equal. The system also includes an optimizer configured to perform a multi-dimensional combination on the first criteria file and the second criteria file to form a third criteria file comprising a fifth attribute category in the first perspective and a sixth attribute category in the first perspective. The fifth attribute category is equal to the first attribute category and the third attribute category. The sixth attribute category is equal to the second attribute category and the fourth attribute category.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 is an illustration of an example of a criterion file for a comparison of chemicals to be used in the illustrative embodiments, in accordance with an illustrative embodiment;

FIG. 5 is an illustration of an example of a criterion file for a comparison of parts where weights are assigned to comparison criteria, in accordance with an illustrative embodiment;

FIG. 6 is an illustration of an example of multiple criterion files for the comparison of parts relating to a given domain for use in creating a combined criterion file, in accordance with an illustrative embodiment;

FIG. 7 is an illustration of an example of an optimal comparison criterion for corrosion resistant parts, in accordance with an illustrative embodiment;

DETAILED DESCRIPTION

Figure 1:
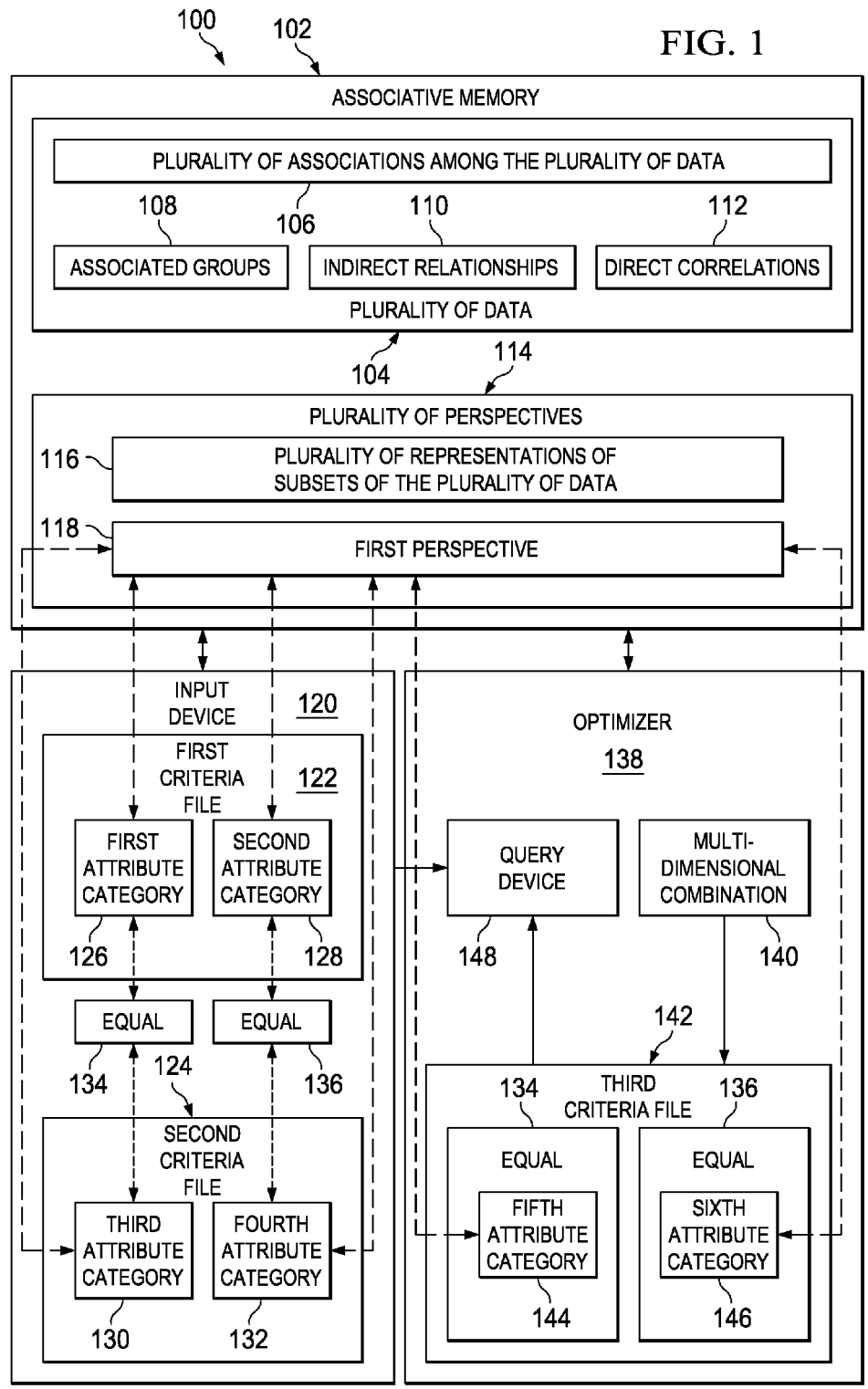
FIG. 1 is a block diagram of a system for formulating queries in an associative memory, in accordance with an illustrative embodiment.

The illustrative embodiments recognize and take into account that formulating optimal queries in an associative memory may be difficult, particularly in technical areas in which the user is not a subject matter expert. Thus, the illustrative embodiments provide devices and methods for automatically optimizing attribute selection for associative memory queries. The illustrative embodiments have many other applications.

The illustrative embodiments provide several useful functions. The illustrative embodiments may provide an efficient mechanism to leverage knowledge across large datasets by creating optimal criteria for everyone's use. This function may lead to substantial cost savings with respect to use of an associative memory. The illustrative embodiments may also bridge knowledge gaps between specialists and novice users, thereby facilitating productivity without having to retain a staff of experts. This function may result in cost avoidance with respect to use of an associative memory. The illustrative embodiments may help reduce the potential for confusion due to the difficulty associated with deriving knowledge or understanding from large and complex datasets. The illustrative embodiments may provide a long-term solution for better criteria selection within an associative memory, thereby again avoiding costs.

Attention now returns to examples of operational functions of the illustrative embodiments described herein. The illustrative embodiments provide for the creation of a systemic approach that allows users to group useful criteria together and assign them to a particular specified attribute within a perspective of the associative memory. Then, when users compare entities, the users can select the best criterion to use pertaining to that particular specified attribute within its perspective based on information gathered from previous usage.

In this manner, the illustrative embodiments may be used to derive optimal criteria in an associative memory. The optimal criteria may be applied in a comparison query in order to obtain results that are more relevant and more accurate.

Stated differently, the illustrative embodiments provide a method and system for creating optimal comparison criteria for entity comparisons within an associative memory. One manner of implementing this illustrative embodiment is to save an individual numeric representation of the comparison criteria in a binary file corresponding to a specific attribute or its perspective. The saved file may remain in the same directory location with other locally saved criteria files within the same perspective, all sharing the same specific attribute. Then, the illustrative embodiments may multi-dimensionally combine and accumulate these criteria files, so that the criteria files can be used by other users. In this manner, other users may leverage the knowledge and expertise of the users who created the criteria files.

In addition, the illustrative embodiments may provide users with a dynamic predetermined filter that automatically selects the best criteria in order to compare entities for a specified attribute of a given perspective within an associative memory. The illustrative embodiments may choose the correct criteria based on a combination of information gathered from previous usage. The illustrative embodiments may help users obtain more relevant entity comparisons by applying subject matter expertise obtained during prior searches. Thus, in one illustrative embodiment, the system may provide an optimal "one size fits all" approach while retaining individual relevance to the perspective or specified attribute if it exists.

As used herein the term "associative memory" refers to a plurality of data and a plurality of associations among the plurality of data. The data and the associations may be stored in a non-transitory computer readable storage medium. The plurality of data may be collected into associated groups. The associative memory may be configured to be queried based on indirect relationships among the plurality of data in addition to direct correlations among the plurality of data. The associative memory may also be configured to be queried based on direct relationships, and combinations of direct and indirect relationships.

Thus, an associative memory may be characterized as a plurality of data and a plurality of associations among the plurality of data. The plurality of data may be collected into associated groups. The associative memory may be configured to be queried based on at least one relationship, selected from a group that includes direct and indirect relationships, among the plurality of data in addition to direct correlations among the plurality of data. An associative memory may also take the form of software. Thus, an associative memory also may be considered a process by which information is collected into associated groups in the interest of gaining new insight based on relationships rather than direct correlation.

As used herein, the term "entity" refers to an object that has a distinct, separate existence, though such existence need not be a material existence. Thus, abstractions and legal constructs may be regarded as entities. As used herein, an entity need not be animate.

As used herein, a "perspective" may be a "point of view." With respect to an associative memory, a perspective may be a choice of a context for a particular aspect of a user's domain.

As used herein a "domain" may be the subject matter at hand for use of analysis.

FIG. 1 is a block diagram of a system for formulating queries in an associative memory, in accordance with an illustrative embodiment. System 100 shown in FIG. 1 may be implemented using one or more data processing systems, possibly in a distributed or networked environment, and possibly by a group of remotely administered data processing systems known as the "cloud." Each of the one or more data processing systems that implement system 100 may be system 1200 described with respect to FIG. 12, or variations thereof. System 100 may be characterized as including one or more blocks. Each of these blocks may be separate or part of a monolithic architecture.

System 100 may include associative memory 102. Associative memory 102 may include plurality of data 104 and plurality of associations among the plurality of data 106. Plurality of data 104 may be collected into associated groups 108. Associative memory 102 may be configured to be queried based on indirect relationships 110 among plurality of data 104 in addition to direct correlations 112 among plurality of data 104.

Associative memory 102 may be logically divided into plurality of perspectives 114. Plurality of perspectives 114 may include a corresponding plurality of representations of subsets of the plurality of data 116. Plurality of perspectives 114 may include specific perspectives, such as first perspective 118.

System 100 may include input device 120. Input device 120 may be a tangible device configured to receive input. Examples of input device 120 include, but are not limited to, a keyboard, a mouse, a touch screen, a tangible processor configured to receive data, a data bus, a tangible voice recognition system, and others. Input device 120 may be configured to receive first criteria file 122 and second criteria file 124. First criteria file 122 may include first attribute category 126 of first perspective 118 in plurality of perspectives 114. First criteria file 122 may also include second attribute category 128 of first perspective 118. Second criteria file 124 may include third attribute category 130 of first perspective 118 and fourth attribute category 132 of first perspective 118. First attribute category 126 and third attribute category 130 may be equal 134. Second attribute category 128 and fourth attribute category 132 may be equal 136. By "equal," the illustrative embodiments contemplate that the attributes in question relate to the same subject matter. For example, first attribute category 126 and third attribute category 130 may both relate to the same property of a material, but the different attributes may relate to different objects of the same material.

System 100 may also include optimizer 138. Optimizer 138 may be a data processing system, such as data processing system 1400 of FIG. 14, operating in conjunction with software stored on a non-transitory computer readable storage medium. Such software may be configured to perform the functions described herein. Optimizer 138 may be configured to perform multi-dimensional combination 140 on first criteria file 122 and second criteria file 124 to form third criteria file 142. Third criteria file 142 may include fifth attribute category 144 of first perspective 118 and sixth attribute category 146 of first perspective 118. Fifth attribute category 144 may be equal 134 to first attribute category 126 and third attribute category 130. Sixth attribute category 146 may be equal 136 to second attribute category 128 and fourth attribute category 132.

In an illustrative embodiment, fifth attribute category 144 may have a fifth value different than either a first value of first attribute category 126 or a third value of third attribute category 130. Likewise, sixth attribute category 146 may have a sixth value different than either of a second value of second attribute category 128 or a fourth value of fourth attribute category 132. However, these corresponding values may be the same in some illustrative embodiments.

In an illustrative embodiment, the first value may be a first user-selectable checkbox. Likewise, the second value may be a second user-selectable checkbox, the third value may be a third user-selectable checkbox, and the fourth value may be a fourth user-selectable checkbox. In an illustrative embodiment, the fifth value may be a fifth checkbox determined by optimizer 138, and the sixth value may be a sixth checkbox determined by optimizer 138. Optimizer 138 may convert each of these checkboxes into a numerical value suitable for computation during multi-dimensional combination 140.

These illustrative embodiments regarding check boxes may be varied. In one illustrative embodiment, the user might be disabled from modifying the fifth and sixth checkboxes, though in other illustrative embodiments the use might be presented with the capability of modifying the fifth and sixth check boxes. In yet another illustrative embodiment, the check boxes may be replaced by numerals, letters, characters, pictures, or any other convenient representation. Other media might also be used, including sound or touch if input device 120 and optimizer 138 are configured accordingly. Thus, the values described above are not limited to numbers.

Multi-dimensional combination 140 may further be influenced by weighting the various values described above. For example, the first value may be assigned a first weight, the second value may be assigned a second weight, the third value may be assigned a third weight different than the first weight, and the fourth value may be assigned a fourth weight different than the second weight. In this illustrative embodiment, optimizer 138 may be further configured to incorporate the first weight, the second weight, the third weight, and the fourth weight as part of multi-dimensional combination 140.

In a specific illustrative embodiment, for example, the first value may be a first check box. The first check box may be assigned a weighting greater or lesser than the remaining check boxes assigned to first attribute category 126. Thus, when performing multi-dimensional combination 140, optimizer 138 may give more or less weight, accordingly, to the first value.

System 100 may be further varied from the illustrative embodiments described above. For example, system 100 may also include query device 148. Query device 148 may be connected to input device 120, but may be connected to any suitable means for receiving input regarding a query. Thus, while a user may use input device 120 to input a query to query device 148, query device 148 may receive a query or information related to a query from other sources, including automatically from processes intended to automatically generate a query or query information. In any case, query device 148 may be configured to use third criteria file 142 to perform a query of associative memory 102. This query may be performed within first perspective 118.

In a specific example related to automatically generating a query, query device 148 may accept as input third criteria file 142 and automatically use third criteria file 142 as the basis for performing a query on associative memory 102. However, in other illustrative embodiments, the user may edit, or have the opportunity to edit, third criteria file 142 before submitting a query. A user may also add additional information to a query, in addition to using third criteria file 142. A user also may elect, in some cases, to ignore third criteria file 142 when generating a query using query device 148.

The illustrative embodiments include a provision for feeding back the results of a multi-dimensional combination into optimizer 138. Thus, input device 120 may be further configured to receive third criteria file 142. In this case, optimizer 138 may be configured to perform multi-dimensional combination 140 on first criteria file 122, second criteria file 124, the third criteria file 142. This new multi-dimensional combination may form a fourth criteria file. The structure of the fourth criteria file may be similar to that of third criteria file 142. Thus, the fourth criteria file may include a seventh attribute category in first perspective 118 and an eighth attribute category in first perspective 118. The seventh attribute category and first attribute category 126 may be equal, and likewise the eighth attribute category and third attribute category 130 may be equal.

The illustrative embodiments shown in FIG. 1 may be further varied. For example, first criteria file 122 and second criteria file 124 may be saved in associative memory 102, or other storage device, according to a single attribute of a perspective or according to a same perspective. Similarly, third criteria file 142 may be saved in associative memory 102, or other storage device, according to one of a specified attribute, a specified perspective, or both. Thus, these criteria files may be accessed according to perspective or attribute of a perspective.

The illustrative embodiments shown in FIG. 1 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 2:
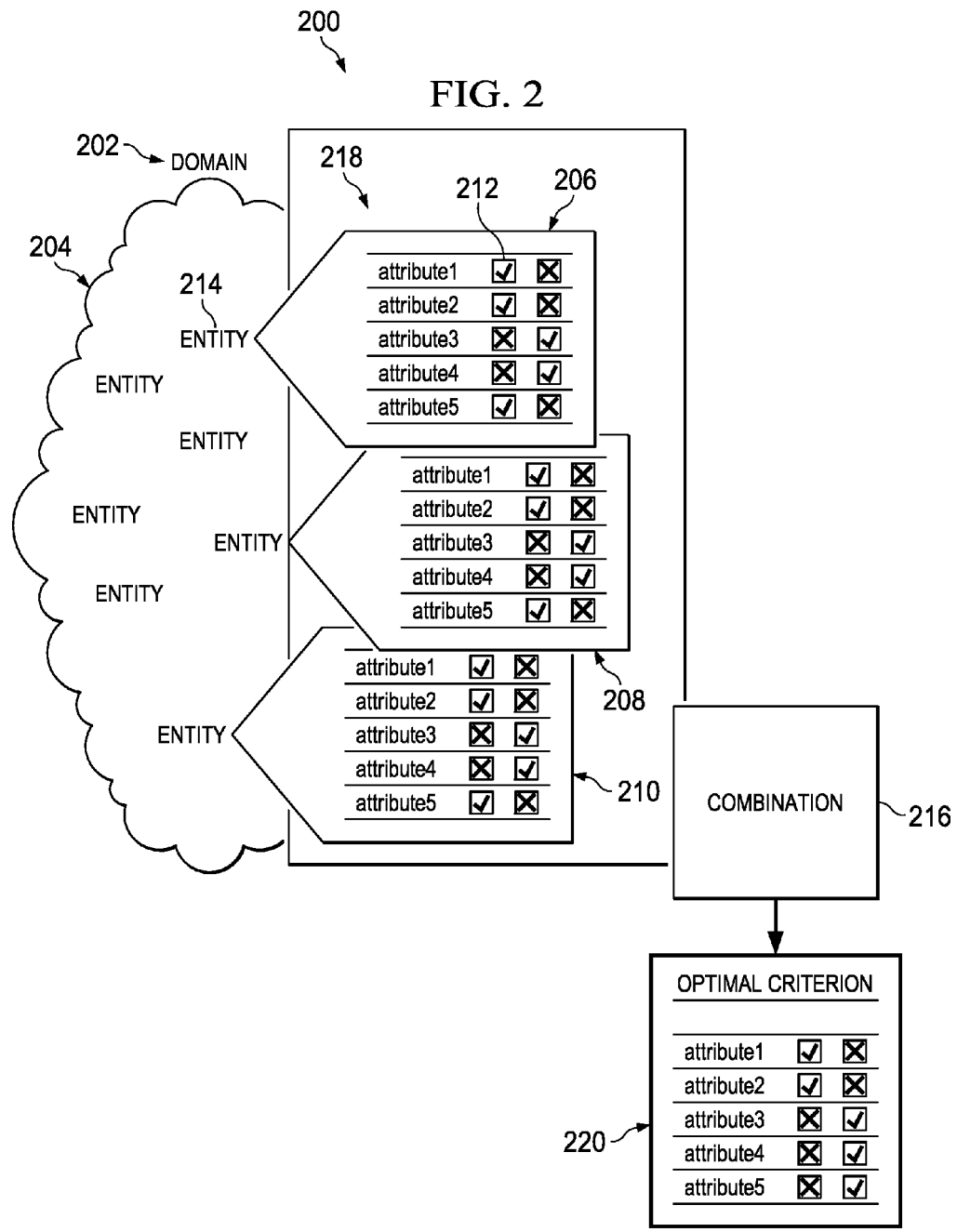
FIG. 2 is an illustration of optimization of attribute selection for a query in an associative memory, in accordance with an illustrative embodiment.

FIG. 2 is an illustration of optimization of attribute selection for a query in an associative memory, in accordance with an illustrative embodiment. The process of optimizing attribute selection for a query in an associative memory may be a specific example of the illustrative embodiment described with respect to FIG. 1.

Attention is briefly returned to an overview of an associative memory. Associative memory 200 may store information by content rather than by address, and stores relationships among the content in order to identify relationships that may not be apparent. This function may be especially useful when working with vast amounts of data. Thus, associative memory technology may be the process by which information is collected into associated groups in the interest of gaining new insight based on relationships, rather than on direct correlation.

Associative memory 200 may include data relating to one or more domains, such as domain 202. Again, a "domain" may be the subject matter at hand for use of analysis. Domain 202 may include one or more entities 204. Again, an "entity" may refer to an object that has a distinct, separate existence, though such existence need not be a material existence. A specific entity may contain one or more attributes used to describe it.

In a specific example, a "domain" may be "aircraft maintenance" and an "entity" may be a specific part used when performing aircraft maintenance. An entity may also be a company that sells the part, a specific piece of data that describes the part, or many other examples of data that relate to domain 202. Each entity may include one or more attributes, such as attributes 206. Attributes 206 may be, for example, a property of the part, such as whether the part is corrosion resistant.

As described above, an issue that may arise when formulating a query of associative memory 200 is that the user may not be a subject matter expert in domain 202. In this case, the resulting comparisons made pursuant to the query may be sub-optimal. Accordingly, the entire business project, such as the maintenance of the aircraft, may be less efficient.

The illustrative embodiments may provide users with a dynamic filter that automatically selects optimal or near-optimal criteria in order to compare entities for a specified attribute of a given perspective within an associative memory. The illustrative embodiments may choose the correct criteria based on a combination of information gathered from previous usage by subject matter experts, who have more full control over selection of attributes when performing a query of associative memory 200. Thus, the illustrative embodiments may help a user obtain more relevant entity comparisons by applying subject matter expertise with an optimal "one size fits all" approach that is relevant to the user's perspective or a specified attribute, if it exists, even though the user is not a subject matter expert.

In a broad, non-limiting example, a subject matter expert may have established first number of values 212 for a number of attributes in attributes 206 that relate to entity 214. The subject matter expert then may save attributes 206 and first number of values 212 in a criterion file. Similarly, the same or different subject matter expert may save values for attributes 208 and attributes 210 in second and third criterion files.

Later, another user, perhaps not a subject matter expert, may take advantage of the subject matter expert's knowledge by generating combination 216 of set of attributes 218. Combination 216 may be generated by multi-dimensional comparison of attributes 206, attributes 208, and attributes 210. The values of these attributes are compared on an attribute-by-attribute basis across all of entities 204 in question. The result is optimal criterion file 220. Optimal criterion file 220 may then be used as the basis of a query of associative memory 200. As a result, the user is able to leverage subject matter expertise without actually being a subject matter expert.

FIG. 3 is an illustration of an example of a criterion file for a comparison of chemicals to be used in the illustrative embodiments, in accordance with an illustrative embodiment. Criterion file 300 may be example of attributes 206, attributes 208, or attributes 210 of FIG. 2. Criterion file 300 may relate to an entity in a domain, such as entity 214 of domain 202 in FIG. 2. Criterion file 300 may also represent a mechanism for inputting the relative relevance of specific properties of a given material into a particular domain.

Again, when using an associative memory to perform entity comparisons, use of precise criteria when formulating a query improves the final query result. Thus, the associative memory may depend on the user to provide as much subject matter expertise as possible in order to perform an entity comparison accurately.

Unfortunately, users who are not subject matter experts may have a difficult time formulating what criteria to use, or the weight to be afforded to the selected criteria. Problems with interpreting the data, and unfamiliarity with the subject matter, may lead to the creation of sub-optimal comparisons.

For example, criterion file 300 may demonstrate a complex dataset. Criterion file 300 may describe criteria for comparing one chemical to another. Determining which criteria of these chemicals to use for a given domain may not be obvious to a user who is not a subject matter expert. For instance, the user may question whether a material's boiling point 302 is more important than a material's vapor pressure 304 when performing a query relating to a given domain.

The illustrative embodiments may be used to create a systemic approach that allows a user to group useful criteria together and assign them to a particular attribute within a perspective. Then, when the user compares entities, the user can select the best criterion to use pertaining to that particular attribute within its perspective based on information gathered from previous usage.

The illustrative embodiments may be iterative. Thus, for example, each query or new combination of attributes may be fed back into the associative memory as additional criterion files. Accordingly, the illustrative embodiments provide for an associative memory that improves with use because the illustrative embodiments retain the previous criteria and then build upon it. The illustrative embodiments also allow non-experts to leverage the knowledge of subject matter experts working on the same dataset, while reducing or eliminating the time spent by subject matter experts on matters that may be handled by non-experts. The illustrative embodiments may be subject matter independent and universally deployable. The illustrative embodiments may also be platform independent and portable.

Figure 4:
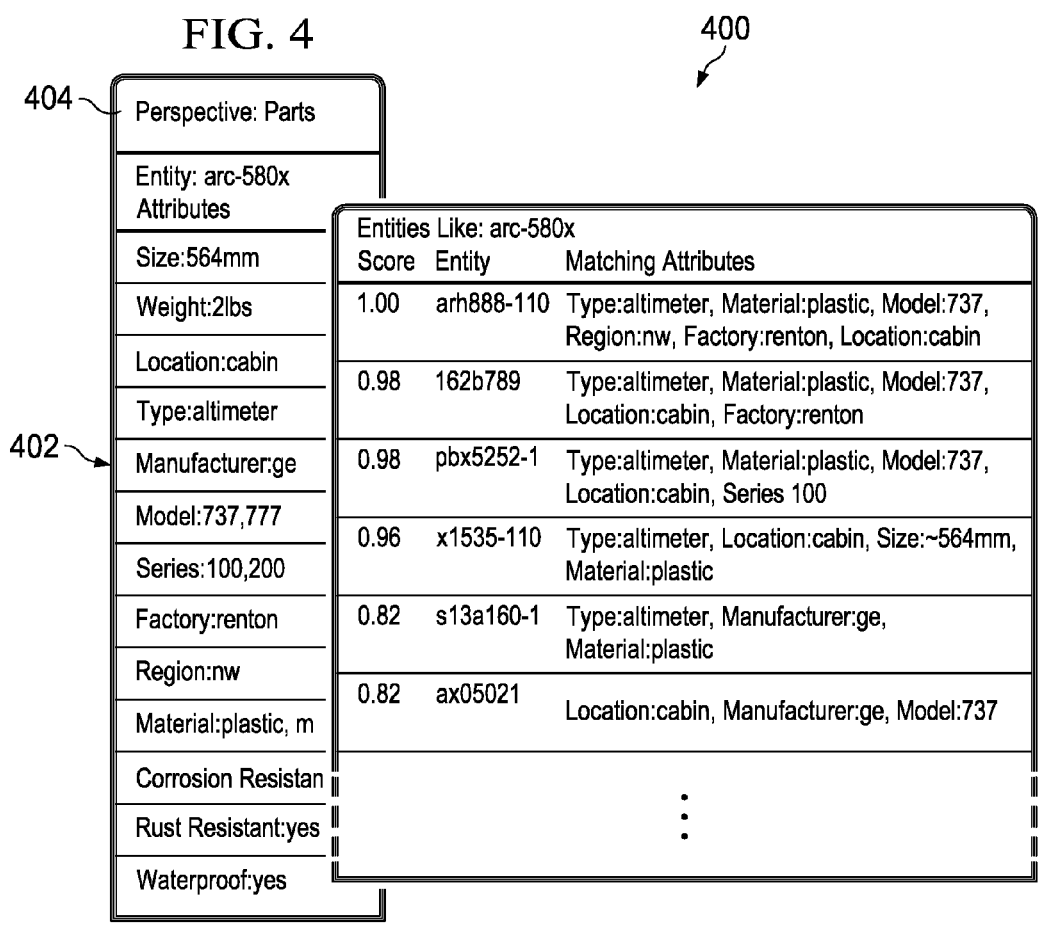
FIG. 4 is an illustration of an example of an entity comparison of parts, in accordance with an illustrative embodiment.

FIG. 4 is an illustration of an example of an entity comparison of parts, in accordance with an illustrative embodiment. Entity comparison 400 of FIG. 4 may be an example of a comparison of entities, such as entities 204 of FIG. 2.

As described above, an associative memory may be logically divided into perspectives, such as perspective 402. Again, a perspective provides a "point of view" or a context for a particular aspect of a user's domain. For example, parts 404 could be a perspective within a problem domain described as "commercial aircraft."

Within an associative memory, the results of an entity comparison may be an ordered list of entities that are "like" or "similar to" the original or sought entity within a perspective. An associative memory may collect all the matching attributes among these entities to formulate the list. The order of that list may depend on the significance of the matching attributes. Additionally, the ranking of the list may correlate to the number of attributes found.

When making comparisons, some of the matching attributes may be more relevant than others. For example, a user could consider matching on an attribute entitled "Region" as less relevant when comparing two parts, whereas matching on their size or material might be a more relevant. Therefore, telling an associative memory what is important and what is not important may be highly useful for obtaining optimal comparisons.

The results shown in FIG. 4 may be sub-optimal because many of the matching attributes may be considered too common and not very relevant. A more relevant comparison, for example, might have been parts that are resistant to corrosion.

FIG. 5 is an illustration of an example of a criterion file for a comparison of parts where weights are assigned to comparison criteria, in accordance with an illustrative embodiment. Criterion file 500 may be another example criterion file 300 of FIG. 3. Criterion file 500 may be an example of attributes 206 in FIG. 2. Criterion file 500 may be an example of either first criteria file 122 or second criteria file 124 of FIG. 1.

Criterion file 500 includes attribute categories 502. Each attribute in attribute categories 502 may be associated with scale 504 indicating a relative importance of a given attribute to a domain of interest. In an illustrative embodiment, scale 504 may take the form of checkboxes 506 that indicate a weighting. A low weighting may be indicated by selecting a left most box and a high weighting may be indicated by selecting a right most box. Relative weightings between high and low may be indicated by selecting a box in between appropriately. In an illustrative embodiment, a subject matter expert may make these selections. A data processing system may convert the selected checkboxes to corresponding numerical values for later processing.

The illustrative embodiments are not limited to the example shown in FIG. 5. For example, a number indicating a relative weighting may be input directly into a dialog box or into another input mechanism. Alternatively, more or fewer checkboxes may be present. Other schemes for indicating a weighting may also be used, such as drop down menus, bar graphs with adjustable bar heights, or other schemes.

Turning now to a use for criterion file 500, in order to obtain relevant comparisons, the illustrative embodiments may use criteria derived from the attribute categories of each entity within a perspective. These attribute categories 502 are shown as a list. A subject matter expert may assign weights to these categories using scale 504, in order to strengthen their association with other attributes, thereby giving them more or less importance.

Each weight corresponds to a level of importance represented in the figure as a range of checkboxes. A user could weigh lesser categories towards the lower end, or not weigh them at all. In other words, the illustrative embodiments may treat failure to select a checkbox as a "zero" weighting, meaning that the attribute in question is irrelevant or not important. Conversely, a user could weigh important or relevant categories towards the higher end.

When a user completes the assignment of weights for a particular entity, he or she can then save the comparison criteria with regard to a specific attribute of that entity within a perspective. For example, if the domain is aircraft maintenance, then for a given corrosive part, attributes pertaining to corrosion may be assigned a weighting and the result saved within a perspective of the associative memory. In an illustrative embodiment, if the subject matter expert does not specify a weighting for an attribute, the illustrative embodiment may use the perspective instead.

The illustrative embodiments may save an individual numeric representation of the comparison criteria in a binary file corresponding to its perspective and a specific attribute, such as "corrosion resistant". This binary file may take other forms, but whatever form is taken may be termed a "criterion file." The saved criterion file may remain in the same directory location with other locally saved criterion files within the same perspective, all sharing the same specific attribute. Then, the illustrative embodiments may multi-dimensionally combine and accumulate these files so that they can be used universally. The result is a combined criterion file. Other combinatory schemes may be used to generate the combined criterion file using various statistical techniques or externally assigned weighting factors.

The resulting combined criterion file may allow other users, perhaps not subject matter experts, to leverage the knowledge and expertise of those subject matter experts who initially created the criterion files. Thus, the illustrative embodiments may allow novice users to produce closer to optimal results without requiring subject matter expertise.

Thus, the illustrative embodiments provide for the ability to inform an associative memory of what criteria to use when performing an entity comparison by using an interface to that associative memory. This interface can vary in scope and functionality. Nevertheless, the interface may preserve the job of defining the criteria in whatever capability the associative memory can handle.

The illustrative embodiments need not be limited to entity comparisons of the same type. The illustrative embodiments may compare entities of different types, such as part characteristics to maintenance requisitions.

FIG. 6 is an illustration of an example of multiple criterion files for the comparison of parts relating to a given domain for use in creating a combined criterion file, in accordance with an illustrative embodiment. Set of criterion files 600 may include criterion file 602, criterion file 604, criterion file 606, and criterion file 608. Each of these criterion files may be, for example, criterion file 500 of FIG. 5, criterion file 300 of FIG. 3, attributes 206 of FIG. 2, or first criteria file 122 or second criteria file 124 of FIG. 1. Each of these criterion files may have been created by one or more subject matter experts.

The illustrative embodiments shown in FIG. 6 represent four different weighting combinations collected for parts resistant to corrosion in a maintenance domain. Each criterion represents what a user determined as valuable relative to evaluating corrosion resistant parts.

The illustrative embodiments may use each of the four criterion files shown in FIG. 6 to calculate an optimal comparison criterion to use when comparing parts that are resistant to corrosion. The illustrative embodiments may derive the calculation by multi-dimensionally combining the saved criteria files and applying the results to a new set of criteria as shown in FIG. 7. Then, an associative memory can apply the new set of criteria to a comparison to obtain results that are more relevant, as shown in FIG. 8.

FIG. 7 is an illustration of an example of an optimal comparison criterion for corrosion resistant parts, in accordance with an illustrative embodiment. Combined criterion file 700 may be an example of third criteria file 142 of FIG. 1, or optimal criterion file 220 of FIG. 2. Combined criterion file 700 may be derived by combining set of criterion files 600 of FIG. 6 into a single criterion file.

In FIG. 7, each attribute category in set of attribute categories 702 may be assigned a given weight in scale 704. This assignment may be performed automatically as a result of the combination of other weights in other criterion files that are assigned to a same attribute category within a specific attribute or the same perspective, if the specific attribute is not specified. The resulting weight for a given attribute in combined criterion file 700 may be the same as or different than a corresponding weight in one of the criterion files used to generate combined criterion file 700.

Figure 8:
FIG. 8 is an illustration of an example of a part comparison, in an associative memory, with relevant results formulated from the optimal comparison criteria for corrosion resistant parts, in accordance with an illustrative embodiment.

FIG. 8 is an illustration of an example of a part comparison with relevant results formulated from the optimal comparison criteria for corrosion resistant parts of an associative memory, in accordance with an illustrative embodiment. Results 800 may be an example of alternative results relative to entity comparison 400 of FIG. 4. Results 800 may be generated using combined criterion file 700 of FIG. 7. Results 800 may be superior to entity comparison 400 of FIG. 4 because results 800 may be generated based on knowledge leveraged from past work by subject matter experts in generating past criterion files. In this manner, even novice users may be able to generate similar query results relative to the results a subject matter expert could generate.

Figure 9:
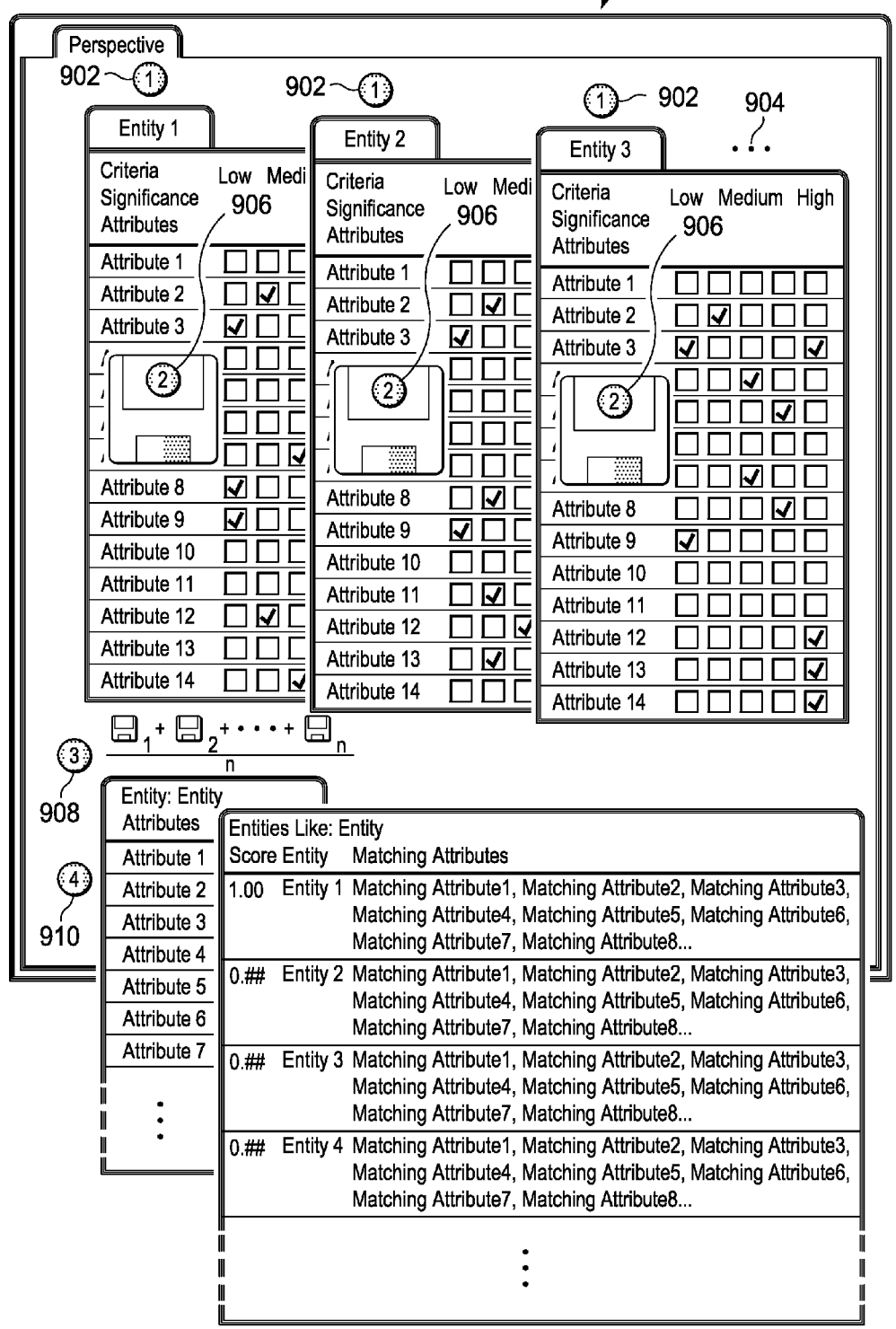
FIG. 9 is a diagram illustrating creation of optimal comparison criteria within an associative memory, in accordance with an illustrative embodiment.

FIG. 9 is a diagram illustrating creation of optimal comparison criteria within an associative memory, in accordance with an illustrative embodiment. Illustration 900 captures the illustrative embodiments, described with respect to FIG. 1 through FIG. 8, in use. As mentioned below, a "process" is described as performing an action. As used herein a "process" is considered to be a non-transitory processor or other physical device configured to perform the action described, or may be considered to be a non-transitory computer readable storage medium storing computer usable program code configured, when executed, to carry out the action described.

For a given perspective or a specified attribute, the process allows those users who feel comfortable with formulating criteria to generate their own criteria and criterion files. This process is shown at each instance of circle "1" 902. Ellipsis 904 indicates that more or fewer criterion files may be generated in this manner than as shown in FIG. 9.

The process then may save each generated criterion numerically in an individual binary file corresponding to its perspective, a specific attribute, or both. This process is shown at each instance of circle "2" 906. The criterion files need not be stored as binary files, but may be stored in other formats. This process may be performed more or fewer times than as shown in FIG. 9.

The process may then multi-dimensionally combine two or more of the generated criterion files, possibly along with other "formulated" files, to create a combination criterion file. This process is shown at circle "3" 908. The combination criterion file may be an accumulation of the criteria regarding that specific attribute within the particular perspective. Mathematical processes other than, or in addition to, multi-dimensional combination may be applied when generating the combination criterion file.

The process then allows other users, regardless of skill level or expertise, to use the combination criterion file as a basis for generating a query to generate more optimal results. This process is shown at circle "4" 910. In this manner, the process may use accumulated average criteria for any entity comparison regarding that specific attribute performed within that perspective. The process may terminate thereafter.

The illustrative embodiments shown in FIG. 9 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 10:
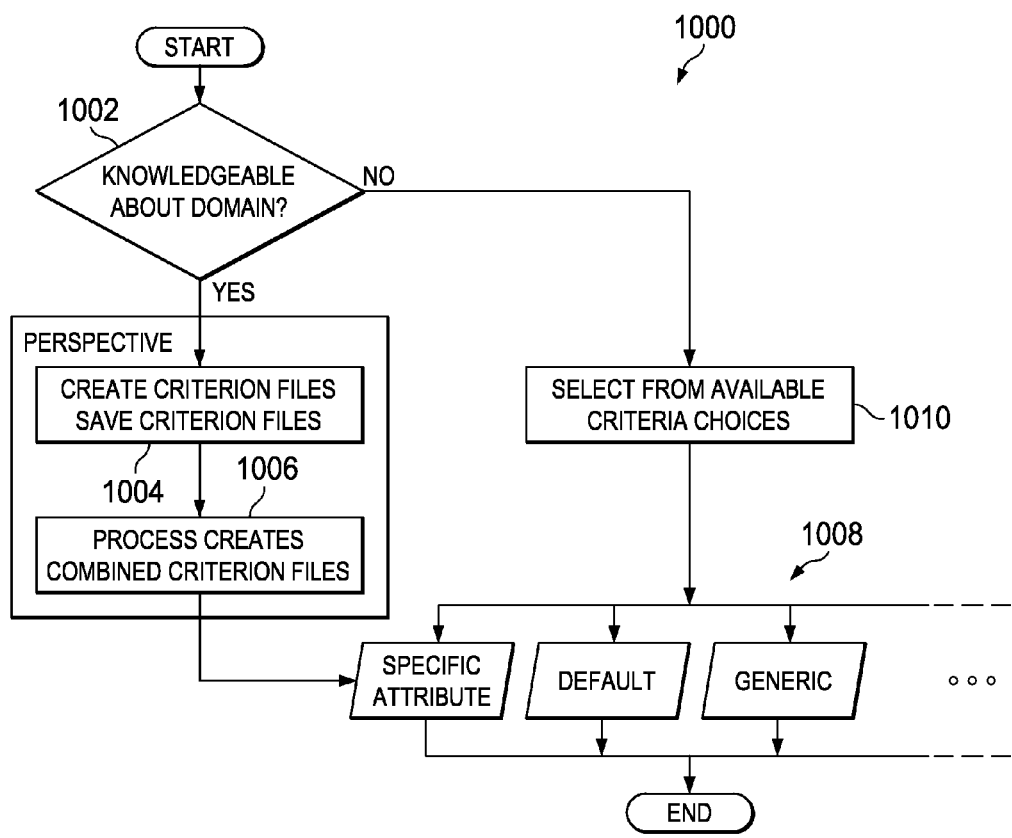
FIG. 10 is a flowchart illustrating creation of optimal comparison criteria within an associative memory, in accordance with an illustrative embodiment.

FIG. 10 is a flowchart illustrating creation of optimal comparison criteria within an associative memory, in accordance with an illustrative embodiment. Process 1000 may be an example of illustration 900 of FIG. 9. Process 1000 may be a flow of the techniques described with respect to FIG. 1 through FIG. 8, in use. As mentioned below, a "process" is described as performing an action. As used herein a "process" is considered to be a non-transitory processor or other physical device configured to perform the action described, or may be considered to be a non-transitory computer readable storage medium storing computer usable program code configured, when executed, to carry out the action described.

The process begins by determining whether the user is knowledgeable about the domain (block 1002). This determination may be made by receiving user input and making the determination based on the user input. This determination may also be made automatically based on an identity of a user that is using the process, or by some other automatic method.

Responsive to the user being knowledgeable (a "yes" determination at block 1002), and within a given perspective, a specific attribute, or both, the process may create and save one or more criterion files based on the criteria provided by the knowledgeable user (block 1004). For example, when a subject matter expert enters criterion and/or weighting of criterion with respect to performing a query of the associative memory, the process automatically creates and saves each criterion file. The subject matter expert need not know or control the process. However, in some illustrative embodiments, the subject matter expert might have some control over whether or how the criterion files are saved.

Then, also within the perspective, a specific attribute, or both, the process creates one or more combined criterion files (block 1006). Each combined criterion file may be created from a combination of two or more of the criterion files created and saved in block 1004. The combination of criterion files is described also with respect to FIG. 1 through FIG. 9.

After creating combined criterion files at block 1006, the user may input choices when selecting criterion for a particular entity comparison (block 1008). Individual boxes within block 1008 represent choices the user has when selecting criterion for a particular entity comparison. Taken as a whole, block 1008 shows one possible configuration of user choices. The user may select from a range of criteria, which may not be as specific as desired. The illustrative embodiments allow the user to select one or more new options at block 1008, expressed as attribute specific criteria. These new options may be included as part of an ultimate query process. Thus, once a selection is made, the process may continue in a larger process of evaluating a comparison. However, with respect to FIG. 10, the process may terminate.

Returning to block 1002, if the user is not knowledgeable about the domain (a "no" answer to block 1002), then a selection is then made from available criterion choices (block 1010). These criterion choices may be expressed as part of block 1008. Once a selection is made, the process may continue in a larger process of evaluating a comparison. However, with respect to FIG. 10, the process may terminate.

The illustrative embodiments shown in FIG. 10 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 11:
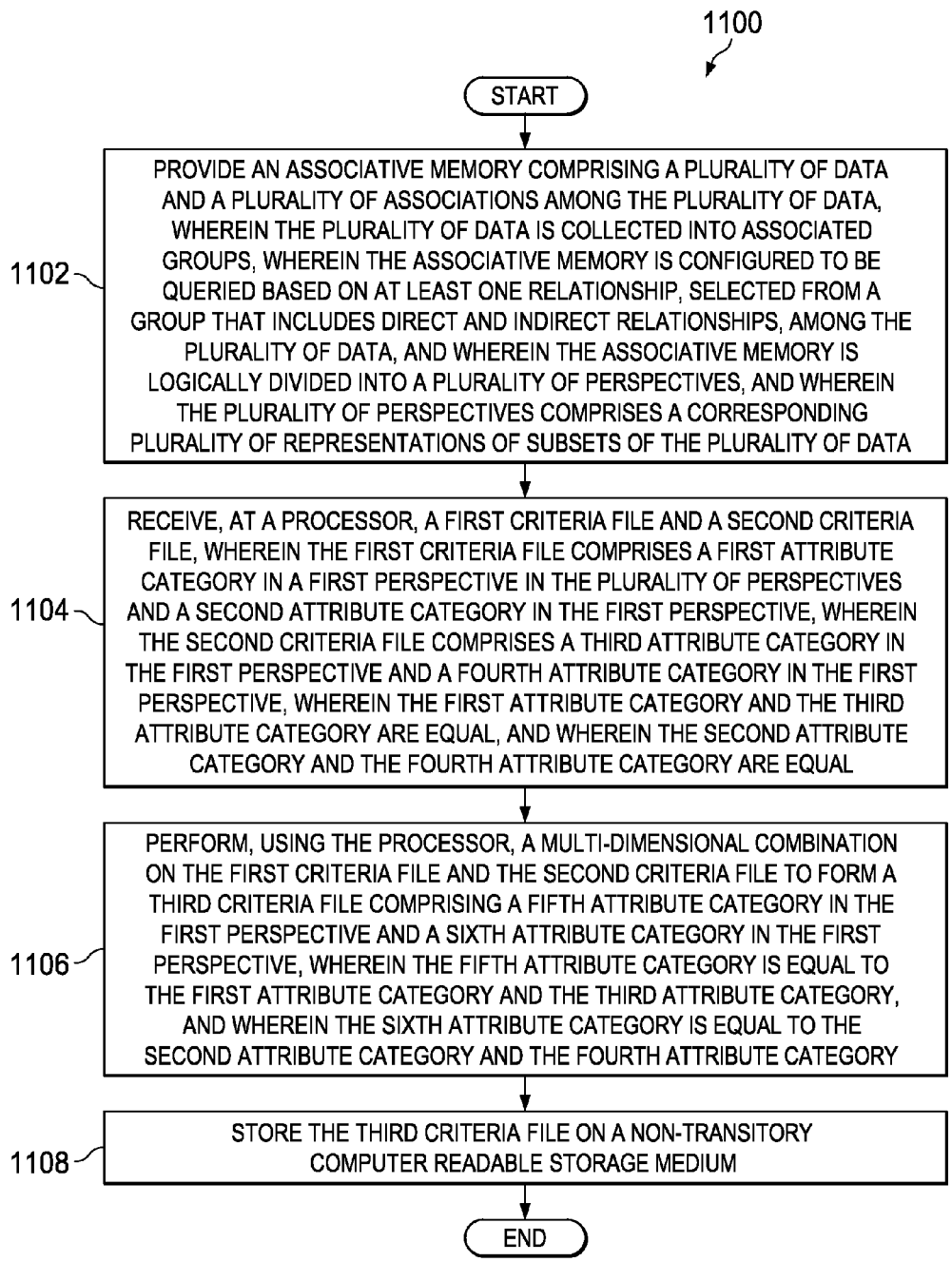
FIG. 11 is a flowchart illustrating creation of optimal comparison criteria within an associative memory, in accordance with an illustrative embodiment.

FIG. 11 is a flowchart illustrating creation of optimal comparison criteria within an associative memory, in accordance with an illustrative embodiment. Process 1100 may be an example of illustration 900 of FIG. 9 and process 1000 of FIG. 10. Process 1100 may be an example of the techniques described with respect to FIG. 1 through FIG. 8, in use. As mentioned below, a "process" is described as performing an action. As used herein a "process" is considered to be a non-transitory processor or other physical device configured to perform the action described, or may be considered to be a non-transitory computer readable storage medium storing computer usable program code configured, when executed, to carry out the action described.

The process begins by providing an associative memory comprising a plurality of data and a plurality of associations among the plurality of data, wherein the plurality of data is collected into associated groups, wherein the associative memory is configured to be queried based on at least one relationship, selected from a group that includes direct and indirect relationships, among the plurality of data, and wherein the associative memory is logically divided into a plurality of perspectives, and wherein the plurality of perspectives comprises a corresponding plurality of representations of subsets of the plurality of data (block 1102). Next, the process receives, at a processor, a first criteria file and a second criteria file, wherein the first criteria file comprises a first attribute category in a first perspective in the plurality of perspectives and a second attribute category in the first perspective, wherein the second criteria file comprises a third attribute category in the first perspective and a fourth attribute category in the first perspective, wherein the first attribute category and the third attribute category are equal, and wherein the second attribute category and the fourth attribute category are equal (block 1104).

Next, the process may perform, using the processor, a multi-dimensional combination on the first criteria file and the second criteria file to form a third criteria file comprising a fifth attribute category in the first perspective and a sixth attribute category in the first perspective, wherein the fifth attribute category is equal to the first attribute category and the third attribute category, and wherein the sixth attribute category is equal to the second attribute category and the fourth attribute category (block 1106). The process then may store the third criteria file on a non-transitory computer readable storage medium (block 1108). The process may terminate thereafter.

The illustrative embodiments shown in FIG. 11 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 12:
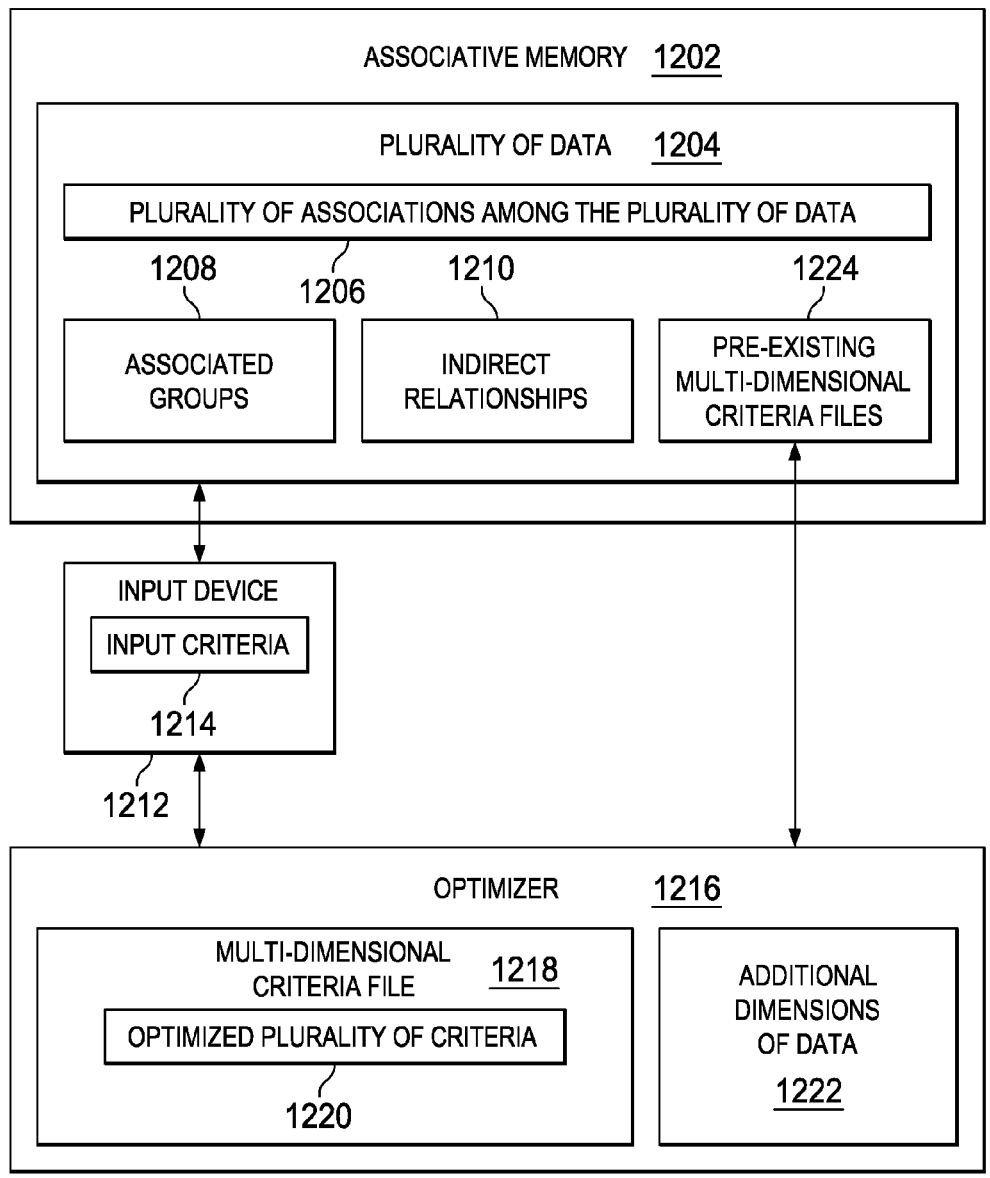
FIG. 12 is a diagram illustrating creation and use of multi-dimensional criteria, in accordance with an illustrative embodiment.

FIG. 12 is a diagram illustrating creation and use of multi-dimensional criteria, in accordance with an illustrative embodiment. System 1200 may be similar to system 100 of FIG. 1. Thus, for example, associative memory 1202 of FIG. 12 may be associative memory 102 of FIG. 1. In some illustrative embodiments, associative memory 102 of FIG. 1 may include the features of FIG. 12 that provide for the creation and use of multi-dimensional criteria and multi-dimensional criteria files.

Before addressing the features of FIG. 12, attention is first turned to multi-dimensional criteria and multi-dimensional criteria files. Multi-dimensional criteria are distinct from a multi-dimensional combination of criteria files. A multi-dimensional combination of criteria files, as described above, may be in one non-limiting example an averaging of corresponding attribute category values (on an attribute category by attribute category basis) for a given set of criteria files, with each criteria file having a similar group of attribute categories. However, as stated elsewhere, the term "multi-dimensional combination" contemplates other mathematical operations on the corresponding attribute category values, including but not limited to weighted averaging, other known statistical mathematical operations, comparison of values followed by selection according to fuzzy logic or neural network routines, or many other techniques.

In contrast, multi-dimensional criteria may be considered the "value" associated with a specific attribute category. Thus, many multi-dimensional criteria may be associated, on a one to one basis for example, with many attribute categories in a criteria file.

Multi-dimensional criteria also stand in contrast to a single-dimensional criterion. A single-dimensional criterion may be, for example, a single number, a single alphanumeric symbol or other symbol, a string of alphanumeric symbols representing one object, or other data representing one or more objects, such as picture files, sound files, and the like. Thus, while a single-dimensional criterion may have multiple numbers, characters, or other data, they are all treated as one object for purposes of a search. For example, if one entered the term "Alaska" into a search engine, several alphanumeric characters may be used, but the search criterion is a single object and thus may be a single-dimensional criterion. Many other examples of single-dimensional criterion exist.

Returning to multi-dimensional criteria, a multi-dimensional criteria may include many values or other data, including but not limited to numbers, alphanumeric symbols or other symbols, picture files, sound files, relationships among data or other forms of metadata, arrays of alphanumeric symbols or other symbols such as matrices, and many other forms of data. The multi-dimensional criteria are arranged as multiple objects. Thus, in a non-limiting example, a multi-dimensional criteria file may include a matrix of numbers representing a vector field. This matrix may be the "value" associated with an attribute category for a criterion file.

To illustrate issues regarding multi-dimensional criteria, consider that multiple attribute categories in a multi-dimensional criteria file may each include similar matrices or other multi-dimensional criteria. A goal in using a multi-dimensional criteria file may be for a non-subject matter expert, unfamiliar with these vector field matrices, to generate a suitable specific multi-dimensional criteria file for use in a specific query for a specific task. In other words, the illustrative embodiments may leverage past criteria files, with multi-dimensional criteria as complex attribute category values previously determined by subject matter experts, to generate an optimized criteria file for a specific query of an associative memory for a specific task.

To better illustrate uses for multi-dimensional criteria, a brief history of search technologies is provided. In decades past, a data source might be a simple database having fields easily searched by a single query object, such as a search term. Subsequently, various types of search engines may employ one or more single dimensional criteria that may be used alone and/or combined using various Boolean operators and/or structured query language (SQL) operators to yield simple or complex search results from an information resource such as one or more databases. However, more recently, vastly more complex information resources have arisen relative to previously available information sources. These complex information sources may be related to complex technologies, products, and information sources related thereto. Such complex technologies and products have resulted in similarly complex information and data resources that describe such technologies and products. To further complicate query issues, certain queries may be performed using multi-dimensional criteria.

The complex data resources or sources described above, such as associative memory technology, have rapidly exceeded the capability of available search engines. Search criteria capabilities and SQL operators may not exist that enable users to find concise and meaningful results to their complex queries. By way of example, nearly all Web users have entered a search term into their web browser, and then tried to sift through the seemingly endless and often meaningless plethora of results. This issue may be exacerbated when working with data sources of even greater complexity, such as associative memory technologies, and may be yet further exacerbated when using multi-dimensional criteria to formulate a query on complex data sources.

Thus, searching and finding data in very complex data sources has become ever more challenging. Finding patterns among data in such complex data sources is even more challenging. With the increasing complexity of data sources, identifying meaningful search criteria and creating useful search queries can be challenging for all but the most experienced subject matter experts, who are limited in number. Thus, a desirable goal may be to leverage the expertise of experienced subject matter experts to enable many more people to quickly obtain desired data without having to consume the limited time of a limited number of subject matter experts.

The illustrative embodiments may enable most non-expert users to independently create optimized search criteria capable of searching complex data sources. Even if the inexperienced user suggests simple or single dimensional search criteria, such simple criteria can be converted into a more optimal, multi-dimensional criteria configured to deliver more concise and meaningful results from complex data sources.

For example, the illustrative embodiments may generate or create one or more multi-dimensional criteria, which in turn may be used to query complex data sources. The contemplated multi-dimensional criteria, for purposes of example, may include multiple criteria relevant to, and/or technologically synonymous with, the suggested single dimensional criteria.

Such relevant criteria may be established and/or identified by the experts, and may also be identified automatically by the associative memory capabilities noted elsewhere herein. Further, the multi-dimensional criteria optionally may also include extra dimensions of data relevant to the criteria. These extra dimensions may include, for example, ranges of high and low limits for such criteria, criteria weights, ranges of weights assigned to and/or inferentially determined by subject matter experts, or other forms of metadata or other related information.

Establishing and generating such multi-dimensional criteria enables ordinary users of complex data sources to improve their ability to these complex data sources despite any relative inability to access subject matter experts. In further illustrative embodiments, multi-dimensional combinations of optimized, relevant criteria may be generated from filtering and comparing search criteria suggested by, and/or of interest to, less experienced consumers of such complex data sources.

The illustrative embodiments also allow single-dimensional criteria to be converted into multi-dimensional criteria before submitting such criteria as a complex query to a complex data source, such as an associative memory. For example, a single-dimensional criterion may be entered by a user and received at an input device. An optimizer may receive the single-dimensional criterion and convert it into multi-dimensional criteria.

This process may be accomplished by entering the single-dimensional criterion as a query to a complex data source, such as an associative memory. Returned results may include multi-dimensional criteria files previously established by subject matter experts. The optimizer, possibly including additional search parameters, may combine these multi-dimensional criteria files into a single optimized multi-dimensional criteria file. The optimizer also may convert input criteria to numerical representations associated with weights provided by subject matter experts. The optimizer may also generate a multi-dimensional criteria file to include an optimized plurality of criteria relevant to the input criteria.

This process also may be accomplished by performing a query of a complex data source, such as an associative memory, using the single-dimensional criterion and receiving results. The results may be combined by the optimizer to create a multi-dimensional criteria file.

This process also may be accomplished by performing a query of a complex data source using the single-dimensional criterion, such as an associative memory, and receiving the results. Previously established multi-dimensional criterion files (or a single file) may then be found or generated based on the received results. This process may be iterative. Ultimately an optimized multi-dimensional criteria file may be generated and used to perform a complex query on a complex data source.

Attention is now returned to FIG. 12. System 1200 may include associative memory 1202. Associative memory 1202 may include plurality of data 1204 and plurality of associations among the plurality of data 1206. Plurality of data 1204 may be collected into associated groups 1208. Associative memory 1202 may be configured to be queried based on at least indirect relationships 1210 among plurality of data 1204.

System 1200 also includes input device 1212. Input device 1212 may be in communication with associative memory 1202. Input device 1212 may be configured to receive input criteria 1214.

System 1200 may also include optimizer 1216. Optimizer 1216 may be in communication with input device 1212 and associative memory 1202. Optimizer 1216 may be configured to generate, using associative memory 1202, multi-dimensional criteria file 1218 from input criteria 1214. Multi-dimensional criteria file 1218 may include optimized plurality of criteria 1220, which may be relevant to input criteria 1214.

In an illustrative embodiment, input criteria 1214 may be a single dimensional criterion. However, in another illustrative embodiment, input criteria 1214 may be multi-dimensional criteria.

In an illustrative embodiment, multi-dimensional criteria file 1218 may include one or more additional dimensions of data 1222 relevant to input criteria 1214. In an illustrative embodiment the one or more additional dimensions of data 1222 may be selected from the group consisting of a range of high and low limits for input criteria 1214, a criteria weight, a range of weights assigned to a subject matter expert, a range of weights inferentially determined by a subject matter expert, and metadata related to input criteria 1214.

In an illustrative embodiment, optimizer 1216 may be configured to generate multi-dimensional criteria file 1218 by combining pre-existing multi-dimensional criteria files 1224 stored in associative memory 1202. Other variations of system 1200 are possible in different illustrative embodiments. For example, system 1200 may also include all of the capabilities of system 100 of FIG. 1, and other capabilities as described elsewhere herein.

In another variation, optimizer 1216 may convert input criteria 1214 to numerical representations associated with expert weights. Expert weights are weights, previously provided or designated by subject matter experts, that are associated with one or more values for one or more attribute categories that correspond to input criteria 1214. Optimizer 1216 may also generate multi-dimensional criteria file 1218 to include optimized plurality of criteria 1220 relevant to input criteria 1214.

Still, other variations are possible. For example, the input criteria may be a single dimensional criterion or multi-dimensional criteria. Multi-dimensional criteria file 1218 may include one or more additional dimensions of data 1222 relevant to the input criteria. The one or more additional dimensions of data 1222 may be selected from the group including a range of high and low limits for input criteria 1214, a criteria weight, a range of weights assigned to a subject matter expert, a range of weights inferentially determined by a subject matter expert, and metadata related to the input criteria. Optimizer 1216 may be configured to generate multi-dimensional criteria file 1218 by combining pre-existing multi-dimensional criteria files 1224 stored in associative memory 1202.

Thus, the illustrative embodiments shown in FIG. 12 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 13:
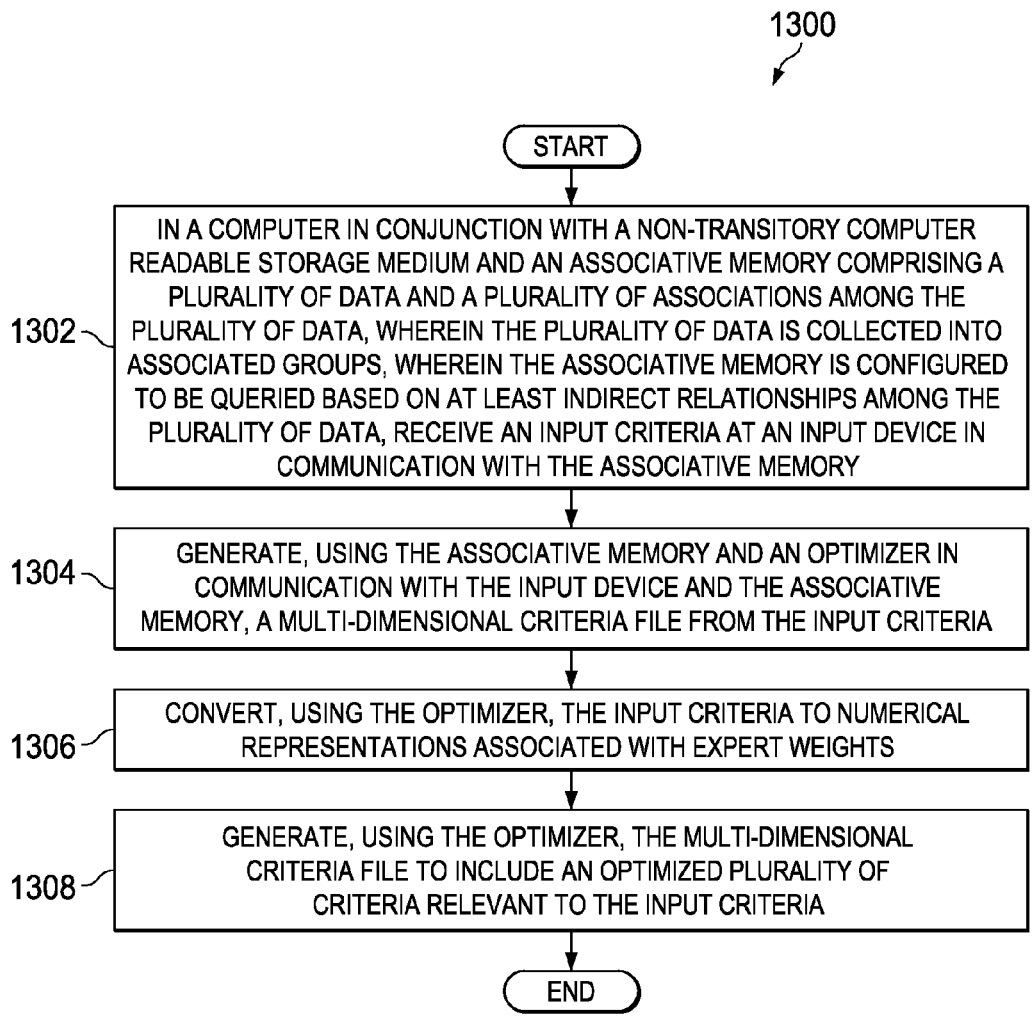
FIG. 13 is a flowchart illustrating creation and use of multi-dimensional criteria, in accordance with an illustrative embodiment.

FIG. 13 is a flowchart illustrating creation and use of multi-dimensional criteria, in accordance with an illustrative embodiment. Process 1300 may be implemented using system 1200 of FIG. 12, system 100 of FIG. 1, or data processing system 1400 of FIG. 14. As mentioned above, a "process" is described as performing an action. As used herein a "process" is considered to be a non-transitory processor or other physical device configured to perform the action described, or may be considered to be a non-transitory computer readable storage medium storing computer usable program code configured, when executed, to carry out the action described.

The process may begin in a computer in conjunction with a non-transitory computer readable storage medium and an associative memory comprising a plurality of data and a plurality of associations among the plurality of data, wherein the plurality of data is collected into associated groups, wherein the associative memory is configured to be queried based on at least indirect relationships among the plurality of data, the process may receive an input criteria at an input device in communication with the associative memory (block 1302). The process may then generate, using the associative memory and an optimizer in communication with the input device and the associative memory, a multi-dimensional criteria file from the input criteria (block 1304). The process may convert, using the optimizer, the input criteria to numerical representations associated with expert weights (block 1306). Finally, the process may generate, using the optimizer, the multi-dimensional criteria file to include an optimized plurality of criteria relevant to the input criteria (block 1308).

Process 1300 shown in FIG. 13 may be varied or may include more or fewer actions. For example, the input criteria may be a single dimensional criterion or multi-dimensional criteria. The multi-dimensional criteria file includes one or more additional dimensions of data relevant to the input criteria. The one or more additional dimensions of data are selected from the group including a range of high and low limits for the input criteria, a criteria weight, a range of weights assigned to a subject matter expert, a range of weights inferentially determined by a subject matter expert, and metadata related to the input criteria. Process 1300 may further generate, using the optimizer, the multi-dimensional criteria file by combining pre-existing multi-dimensional criteria files stored in the associative memory.

Thus, the illustrative embodiments shown in FIG. 13 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 14:
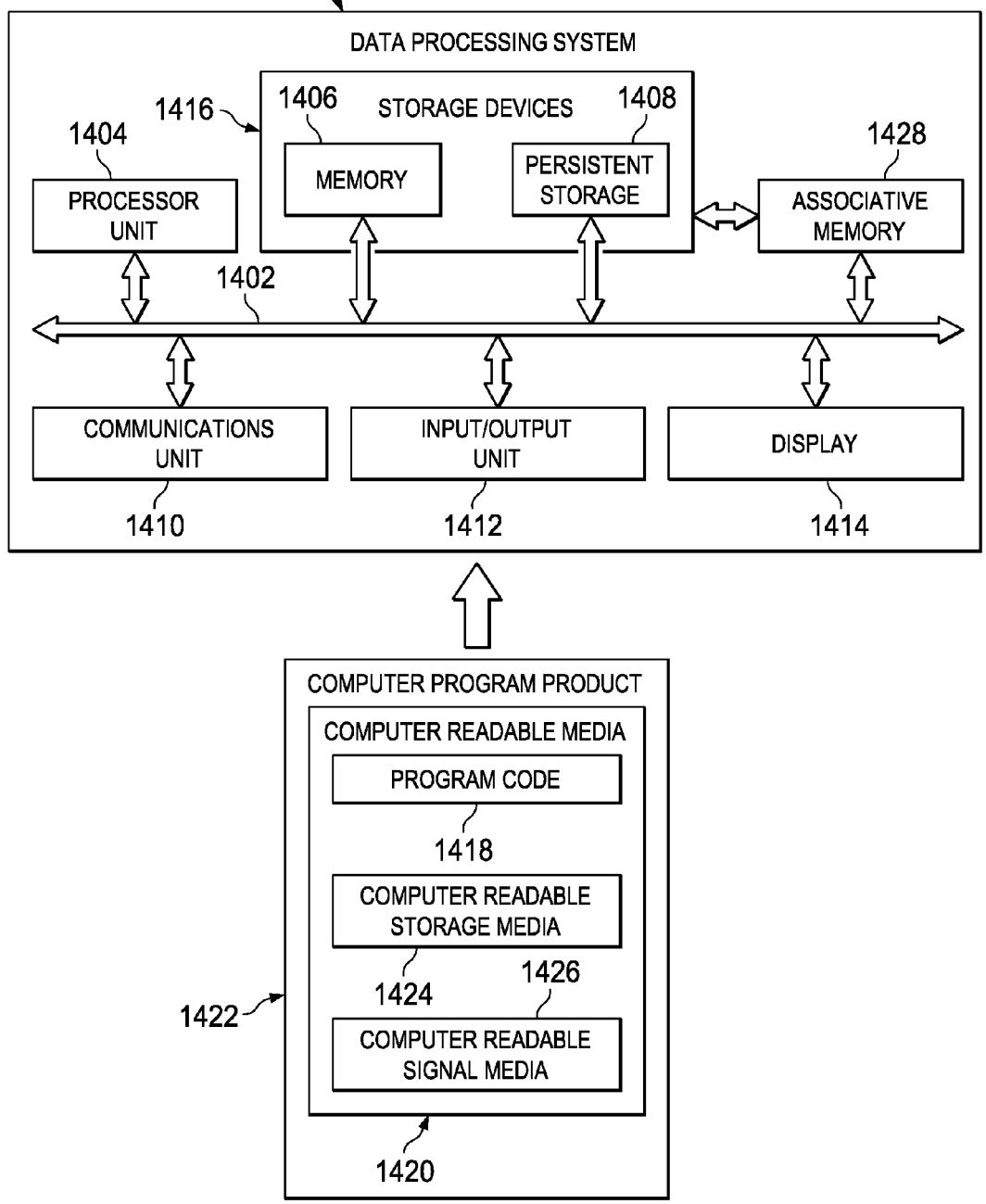
FIG. 14 is an illustration of a data processing system, in accordance with an illustrative embodiment.

Turning now to FIG. 14, an illustration of a data processing system is depicted in accordance with an illustrative embodiment. Data processing system 1400 in FIG. 14 is an example of a data processing system that may be used to implement the illustrative embodiments, such as system 100 of FIG. 1, or any other module or system or process disclosed herein. In this illustrative example, data processing system 1400 includes communications fabric 1402, which provides communications between processor unit 1404, memory 1406, persistent storage 1408, communications unit 1410, input/output (I/O) unit 1412, and display 1414.

Processor unit 1404 serves to execute instructions for software that may be loaded into memory 1406. Processor unit 1404 may be a number of processors, a multi-processor core, or some other type of processor, depending on the particular implementation. A number, as used herein with reference to an item, means one or more items. Further, processor unit 1404 may be implemented using a number of heterogeneous processor systems in which a main processor is present with secondary processors on a single chip. As another illustrative example, processor unit 1404 may be a symmetric multi-processor system containing multiple processors of the same type.

Memory 1406 and persistent storage 1408 are examples of storage devices 1416. A storage device is any piece of hardware that is capable of storing information, such as, for example, without limitation, data, program code in functional form, and/or other suitable information either on a temporary basis and/or a permanent basis. Storage devices 1416 may also be referred to as computer readable storage devices in these examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these examples, provides for communications with other data processing systems or devices. In these examples, communications unit 1410 is a network interface card. Communications unit 1410 may provide communications through the use of either or both physical and wireless communications links.

Input/output unit 1412 allows for input and output of data with other devices that may be connected to data processing system 1400. For example, input/output unit 1412 may provide a connection for user input through a keyboard, a mouse, and/or some other suitable input device. Further, input/output unit 1412 may send output to a printer. Display 1414 provides a mechanism to display information to a user.

Instructions for the operating system, applications, and/or programs may be located in storage devices 1416, which are in communication with processor unit 1404 through communications fabric 1402. In these illustrative examples, the instructions are in a functional form on persistent storage 1408. These instructions may be loaded into memory 1406 for execution by processor unit 1404. The processes of the different embodiments may be performed by processor unit 1404 using computer implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these examples. In one example, computer readable media 1420 may be computer readable storage media 1424 or computer readable signal media 1426. Computer readable storage media 1424 may include, for example, an optical or magnetic disk that is inserted or placed into a drive or other device that is part of persistent storage 1408 for transfer onto a storage device, such as a hard drive, that is part of persistent storage 1408. Computer readable storage media 1424 also may take the form of a persistent storage, such as a hard drive, a thumb drive, or a flash memory, that is connected to data processing system 1400. In some instances, computer readable storage media 1424 may not be removable from data processing system 1400.

Alternatively, program code 1418 may be transferred to data processing system 1400 using computer readable signal media 1426. Computer readable signal media 1426 may be, for example, a propagated data signal containing program code 1418. For example, computer readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1418 may be downloaded over a network to persistent storage 1408 from another device or data processing system through computer readable signal media 1426 for use within data processing system 1400. For instance, program code stored in a computer readable storage medium in a server data processing system may be downloaded over a network from the server to data processing system 1400. The data processing system providing program code 1418 may be a server computer, a client computer, or some other device capable of storing and transmitting program code 1418.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1404 may take the form of a hardware unit that has circuits that are manufactured or configured for a particular use. This type of hardware may perform operations without needing program code to be loaded into a memory from a storage device to be configured to perform the operations.

For example, when processor unit 1404 takes the form of a hardware unit, processor unit 1404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1418 may be omitted because the processes for the different embodiments are implemented in a hardware unit.

In still another illustrative example, processor unit 1404 may be implemented using a combination of processors found in computers and hardware units. Processor unit 1404 may have a number of hardware units and a number of processors that are configured to run program code 1418. With this depicted example, some of the processes may be implemented in the number of hardware units, while other processes may be implemented in the number of processors.

As another example, a storage device in data processing system 1400 is any hardware apparatus that may store data. Memory 1406, persistent storage 1408, and computer readable media 1420 are examples of storage devices in a tangible form.

In another example, a bus system may be used to implement communications fabric 1402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1406, or a cache, such as found in an interface and memory controller hub that may be present in communications fabric 1402.

Data processing system 1400 may also include associative memory 1428. Associative memory 1428 may be associative memory 102 of FIG. 1 or associative memory 1202 of FIG. 12, and may have the properties described elsewhere herein. Associative memory 1428 may be in communication with communications fabric 1402. Associative memory 1428 may also be in communication with, or in some illustrative embodiments, be considered part of storage devices 1416. While one associative memory 1428 is shown, additional associative memories may be present.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
    an associative memory comprising a plurality of data and a plurality of associations among the plurality of data, wherein the plurality of data is collected into associated groups, wherein the associative memory is configured to be queried based on at least indirect relationships among the plurality of data;
    an input device in communication with the associative memory, the input device configured to receive an input criteria; and
    an optimizer in communication with the input device and the associative memory, the optimizer configured to generate, using the associative memory, a multi-dimensional criteria file from the input criteria, wherein the optimizer converts the input criteria to numerical representations associated with expert weights and generates the multi-dimensional criteria file to include an optimized plurality of criteria relevant to the input criteria;
    wherein the optimizer is further configured to select the optimized plurality of criteria to compare entities associated with a specified attribute of a given perspective within the associative memory.

2. The system of claim 1, wherein the input criteria comprises a single dimensional criterion.

3. The system of claim 1, wherein the input criteria comprises multi-dimensional criteria.

4. The system of claim 1, wherein the multi-dimensional criteria file includes one or more additional dimensions of data relevant to the input criteria.

5. The system of claim 4, wherein the one or more additional dimensions of data are selected from the group consisting of a range of high and low limits for the input criteria, a criteria weight, a range of weights assigned to a subject matter expert, a range of weights inferentially determined by a subject matter expert, and metadata related to the input criteria.

6. The system of claim 1, wherein the optimizer is configured to generate the multi-dimensional criteria file by combining pre-existing multi-dimensional criteria files stored in the associative memory.

7. The system of claim 1, wherein the optimized plurality of criteria is selected based on a combination of information gathered from previous usage by a subject matter expert, the combination of information including one or more of an input criterion and an expert weight of an input criterion with respect to performing a query of the associative memory.

8. The system of claim 1, wherein the multi-dimensional criteria file includes one or more attribute categories that are each associated with a scale to indicate a weighting of an attribute category.

9. A method implemented using a computer in conjunction with a non-transitory computer readable storage medium and an associative memory comprising a plurality of data and a plurality of associations among the plurality of data, wherein the plurality of data is collected into associated groups, wherein the associative memory is configured to be queried based on at least indirect relationships among the plurality of data, the method comprising:
  receiving an input criteria at an input device in communication with the associative memory;
  generating, using the associative memory and an optimizer in communication with the input device and the associative memory, a multi-dimensional criteria file from the input criteria;
  converting, using the optimizer, the input criteria to numerical representations associated with expert weights;
  generating, using the optimizer, the multi-dimensional criteria file to include an optimized plurality of criteria relevant to the input criteria; and
  selecting, using the optimizer, the optimized plurality of criteria to compare entities associated with a specified attribute of a given perspective within the associative memory.

10. The method of claim 9, wherein the input criteria comprises a single dimensional criterion.

11. The method of claim 9, wherein the input criteria comprises multi-dimensional criteria.

12. The method of claim 9, wherein the multi-dimensional criteria file includes one or more additional dimensions of data relevant to the input criteria.

13. The method of claim 12, wherein the one or more additional dimensions of data are selected from the group consisting of a range of high and low limits for the input criteria, a criteria weight, a range of weights assigned to a subject matter expert, a range of weights inferentially determined by a subject matter expert, and metadata related to the input criteria.

14. The method of claim 9, further comprising:
  generating, using the optimizer, the multi-dimensional criteria file by combining pre-existing multi-dimensional criteria files stored in the associative memory.

15. A system comprising:
  an associative memory comprising a plurality of data and a plurality of associations among the plurality of data, wherein the plurality of data is collected into associated groups, wherein the associative memory is configured to be queried based on at least one relationship, selected from a group that includes direct and indirect relationships, among the plurality of data, and wherein the associative memory is logically divided into a plurality of perspectives, and wherein the plurality of perspectives comprises a corresponding plurality of representations of subsets of the plurality of data;
  an input device configured to receive a first criteria file and a second criteria file, wherein the first criteria file comprises a first attribute category in a first perspective in the plurality of perspectives and a second attribute category in the first perspective, wherein the second criteria file comprises a third attribute category in the first perspective and a fourth attribute category in the first perspective, wherein the first attribute category and the third attribute category are equal, and wherein the second attribute category and the fourth attribute category are equal; and
  an optimizer configured to perform a multi-dimensional combination on the first criteria file and the second criteria file to form a third criteria file comprising a fifth attribute category in the first perspective and a sixth attribute category in the first perspective, wherein the fifth attribute category is equal to the first attribute category and the third attribute category, and wherein the sixth attribute category is equal to the second attribute category and the fourth attribute category; and
  wherein the optimizer converts input criteria to numerical representations associated with expert weights and generates the third criteria file to include an optimized plurality of criteria relevant to the input criteria;
  wherein the optimizer is further configured to select the optimized plurality of criteria to compare entities associated with a specified attribute of the first perspective within the associative memory.

16. The system of claim 15 further comprising:
  a query device configured to use the third criteria file to perform a query of the associative memory in the first perspective.

17. The system of claim 15, wherein the fifth attribute category has a fifth value different than either a first value of the first attribute category or a third value of the third attribute category, and wherein the sixth attribute category has a sixth value different than either of a second value of the second attribute category or a fourth value of the fourth attribute category.

18. The system of claim 17, wherein the first value comprises a first user-selectable checkbox, the second value comprises a second user-selectable checkbox, the third value comprises a third user-selectable checkbox, the fourth value comprises a fourth user-selectable checkbox, the fifth value comprises a fifth checkbox determined by the optimizer, and the sixth value comprises a sixth checkbox determined by the optimizer.

19. The system of claim 15, wherein the input device is further configured to receive the third criteria file, and wherein the optimizer is configured to perform the multi-dimensional combination on the first criteria file, the second criteria file, and the third criteria file to form a fourth criteria file comprising a seventh attribute category in the first perspective and an eighth attribute category in the first perspective, wherein the seventh attribute category and the first attribute category are equal, and wherein the eighth attribute category and the third attribute category are equal.

20. The system of claim 15, wherein the first value is assigned a first weight, wherein the second value is assigned a second weight, wherein the third value is assigned a third weight different than the first weight, wherein the fourth value is assigned a fourth weight different than the second weight, and wherein the optimizer is further configured to incorporate the first weight, the second weight, the third weight, and the fourth weight as part of the multi-dimensional combination.

21. The system of claim 15, wherein the first criteria file and the second criteria file are saved according to a single attribute of a perspective or according to a same perspective.

22. The system of claim 15, wherein the third criteria file is saved according to one of a specified attribute, a specified perspective, or both.

* * * * *